W. T. BERRY.

Letter Sheet and Envelope.

No. 9,171. Reissued April 27, 1880.

WITNESSES

Robert Everett

Chas. G. Page

INVENTOR

William T. Berry

Gilmore Smith & Co.

ATTORNEYS

UNITED STATES PATENT OFFICE.

WILLIAM T. BERRY, OF MAYSVILLE, KENTUCKY.

LETTER-SHEET AND ENVELOPE.

SPECIFICATION forming part of Reissued Letters Patent No. 9,171, dated April 27, 1880.

Original No. 192,411, dated June 26, 1877. Application for reissue filed December 3, 1879.

*To all whom it may concern:*

Be it known that I, WILLIAM T. BERRY, of Maysville, in the county of Mason and the State of Kentucky, have invented a new and useful Improvement in Letter-Sheets and Envelopes; and I do hereby declare the following to be a full, clear, and exact description of the same.

My invention relates to combined letter-sheets and envelopes made of one piece of paper; and it consists in a combined letter-sheet and envelope having short side flaps and a large rectangular sealing-flap; also, in the construction of a combined letter-sheet and envelope, the letter-sheet of which is notched or serrated in its edges to serve as guides for folding the same, all as fully described in the following specification, and particularly pointed out in the claims.

The annexed drawings, to which reference is made, fully illustrate my invention.

Figure 1:
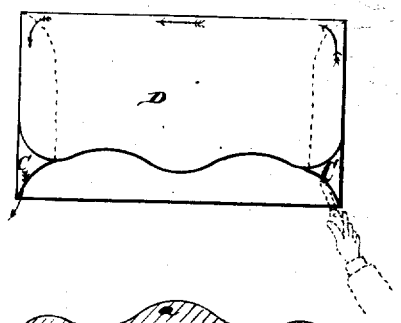
Figure 2:
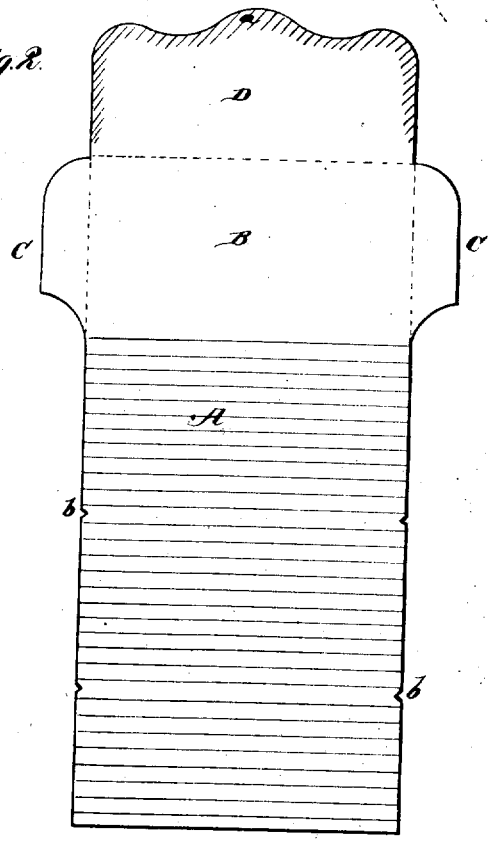

Figure 1 shows the letter-sheet and envelope closed. Fig. 2 shows the same extended.

A designates a single sheet of note-paper, which is at the top extended to form a rectangular piece, B, of about the same size as the letter to be folded. From each end of the piece B projects a short side flap, C, of the same width at its inner end as the piece B, and its upper edge nearly on a line with the upper edge of the said piece, while the lower edge is cutout, substantially as shown, so that its outer end will be narrower than the inner end. The two flaps C C, not gummed, are made of such length that when folded inward their outer ends will clasp over the ends of the folded letter-sheet.

From the outer edge of the piece B projects another outer or safety flap, D, of suitable size to be folded over the two flaps C C, and on the under side of said flap D, along its edges, is applied mucilage or other adhesive substance, as shown at *a*, so that when folded the flap D may be fastened down on the flaps C C and on the back of the folded sheet A. This outer flap, D, is preferably rectangular in form, and is of the same length as the part marked B, and of width nearly sufficient to cover the same.

Heretofore, when attempts have been made to construct a combined letter-sheet and envelope, the part corresponding to the outer flap, D, has been constructed in a triangular shape and of comparatively small length and breadth; therefore it is obvious that when constructed as last mentioned but little security is afforded to the contents, whereas, by my large rectangular outer flap, gummed on three sides, ample protection is given.

The letter-sheet proper is notched or serrated, as shown at *b*, at suitable intervals on the edges of the sheet to serve as guides for folding the same. The side flaps, C C, are made narrow for the purpose of saving material. The sheet A, with the piece B and flaps C C and D, are all cut from one piece of paper, and are intended to remain in one piece until the letter is to be opened after being sealed.

This invention may also be applied to double and triple sheets, note-paper, and also for letter size, making it useful for all kinds of correspondence. Of course the combined sheet and envelope may be made of parchment and other material suitable for the purpose, as well as of paper, and it may be made of any size, finish, and quality, as may be desired for its various purposes. It may also be used for advertising purposes, and the part of the envelope which is ordinarily thrown away is or may be, by this invention, utilized.

In Fig. 2 I have shown the flaps C simply made large enough to fold over the letter, which will answer for ordinary correspondence.

It will be apparent that by thus forming the part B and flap D as a continuation of the note or letter sheet A, and by making the flaps C C quite short, as shown in said Fig. 2, in cutting out the letter-sheet and envelope a great saving in material will be effected, since if the flap D is constructed of a triangular shape and of comparatively small length and breadth, as hereinbefore mentioned, the flaps C would necessarily have to be made long and extended out some distance from the part B, which would involve great waste.

In the manufacture and shipping of this article, as a general rule, the flaps will be folded as indicated by dotted lines; also, the letter-sheet may be folded, but this is not desirable, as it creases the paper.

To open the sealed combined letter-sheet and envelope a knife or sharp instrument is introduced under one corner of the side flap and extended around the edge to the opposite corner, as shown in Fig. 1, thereby severing the flaps from the main body of the sheet and allowing the letter to be inspected.

What I claim as new, and desire to secure by Letters Patent, is—

1. In a combined letter-sheet and envelope, the note or letter sheet A, having an extended part, B, with short ungummed side flaps, C C, and a large rectangular sealing-flap, D, all constructed substantially as shown and described, and for the purposes specified.

2. In a combined letter-sheet and envelope, the letter-sheet formed with notches or serrations in its edges to serve as guides for folding the same, substantially as herein shown and described.

In testimony that I claim the above I have hereunto subscribed my name in the presence of two witnesses.

WILLIAM THOMAS BERRY.

Attest:
SAML. S. RILEY.
E. F. THOMAS